Dec. 29, 1953  S. P. RADELOFF ET AL  2,664,228
MEASURING-TYPE POUR-SPOUT
Filed Sept. 14, 1949  2 Sheets-Sheet 1
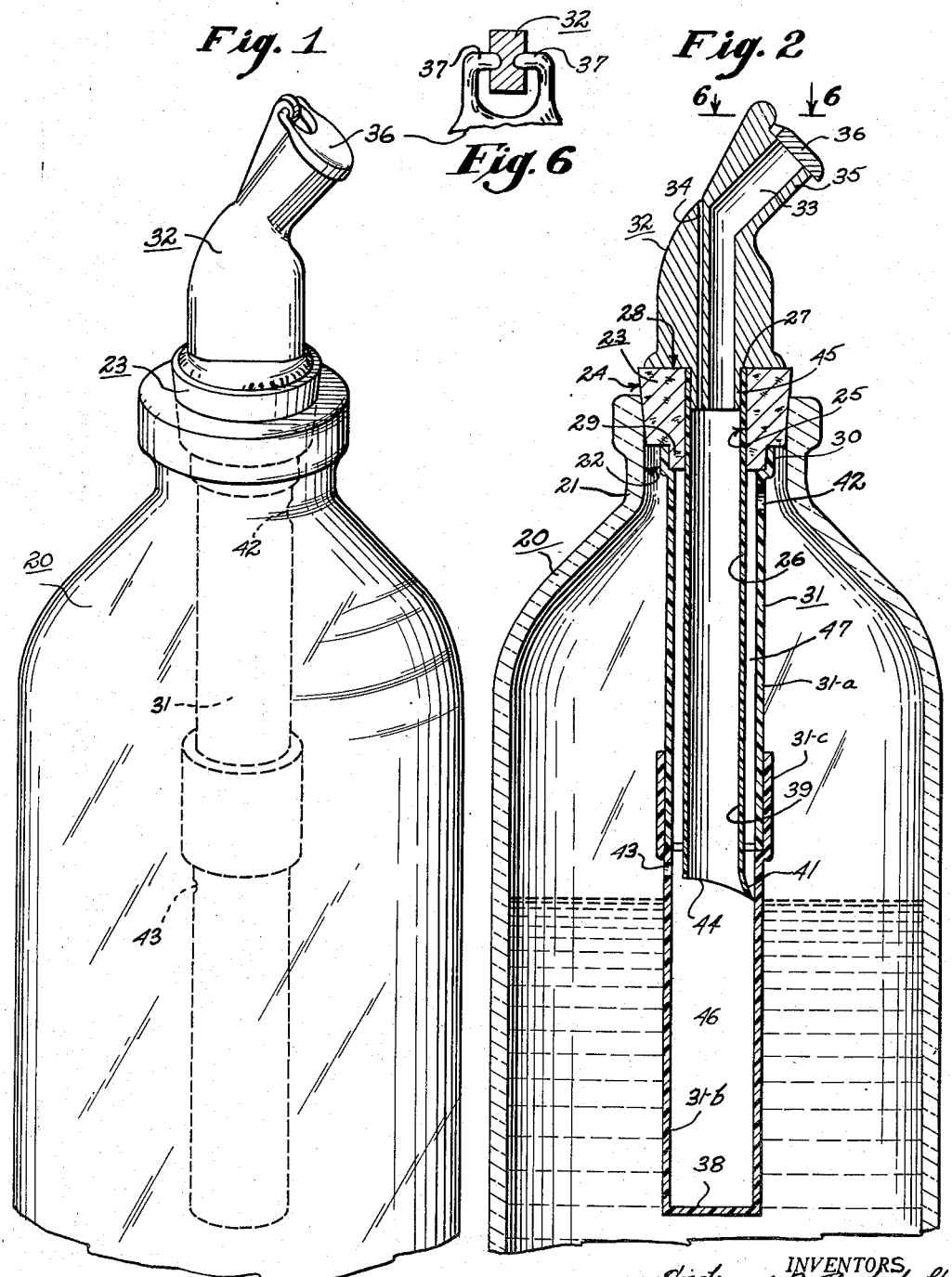
INVENTORS
Sidney P. Radeloff
Raymond J. Falcone
BY
Leonard L. Kalish
ATTORNEY Dec. 29, 1953 S. P. RADELOFF ET AL 2,664,228
MEASURING-TYPE POUR-SPOUT
Filed Sept. 14, 1949 2 Sheets-Sheet 2

INVENTORS
Sidney P. Radeloff
Raymond J. Falcone
BY
Leonard L. Kalish
ATTORNEY

Patented Dec. 29, 1953

2,664,228

UNITED STATES PATENT OFFICE 2,664,228

MEASURING-TYPE POUR-SPOUT

Sidney P. Radeloff and Raymond J. Falcone, Philadelphia, Pa.

Application September 14, 1949, Serial No. 115,736

8 Claims. (Cl. 222—455)

The present invention relates to a new and useful stopper and measuring-type pour-spout for fluid-containers. The present invention relates still more particularly to a combination bottle-stopper and pour-spout having means associated therewith whereby a predetermined quantity of liquid will be measured and dispensed from the container to which said stopper and pour-spout are secured when said container is inverted.

An object of the present invention is to provide means for dispensing a predetermined quantity of liquid from a container; said measuring means confined wholly within said container.

Another object of the present invention is to provide a metering means for dispensing a predetermined quantity of liquid from a container, said metering means supported wholly by the closure on said container.

Further objects of the present invention will be apparent by reference to the appended specification, claims and drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

Referring to the drawings wherein like reference characters indicate like parts:

Figure 1 represents a perspective view of a fluid-container with the measuring-type pour-spout of the present invention operatively secured thereto.

Figure 2 represents a vertical cross-sectional view of the measuring-type pour-spout of the present invention shown in Figure 1.

Figure 6 represents a cross-sectional view along line 6—6 of Figure 2.

Figure 3:
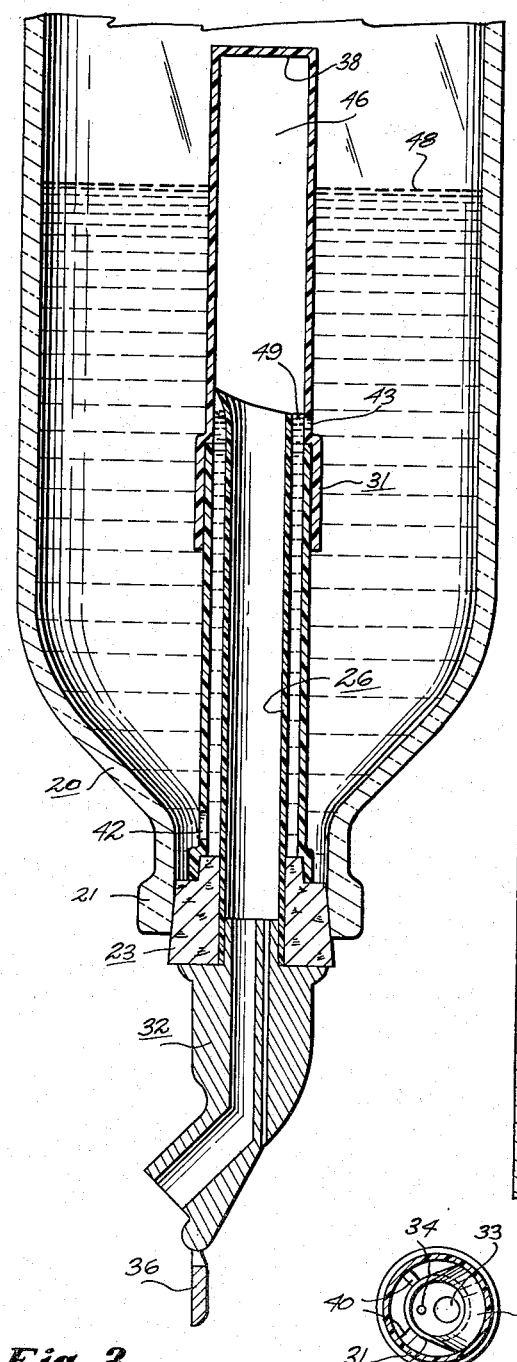
Figure 3 represents a cross-sectional view similar to that of Figure 2 but showing the liquid-containing bottle in its inverted position with a predetermined quantity of fluid within the metering means of the present invention.

The measuring-type pour-spout of the present invention is a narrow, generally cylindrical tubular container adapted to fit within the bottle of fluid from which predetermined quantities and metered amounts of fluid are to be dispensed. The fluid-container or bottle 20 may be of any customary or standard design, having a neck-portion 21 and an orifice or opening 22 therein into which a closure or stopper 23 may be frictionally inserted or otherwise held therewithin. To insure a fluid-tight fit between the neck 21 and the stopper 23, the stopper may be tapered, as at 24, and may be of any resilient, compressible material such as cork or rubber or synthetic material such as "neoprene" or the like. Instead of a tapered stopper, it is to be understood that a screw-type closure may be employed.

The stopper 23 has an internal bore 25 therein, adapted to receive a cylindrical or tubular conduit 26, with the upper edge 27 of the tube 26 approximately co-extensive with the upper edge 28 of the stopper 23. The upper end of the conduit 26 may be cemented or otherwise securely held within the bore 25 of the stopper 23.

The lower end of the stopper 23 has a reduced diametered portion 29 thereon adapted to receive and have secured thereto in fluid-tight relationship the upper end 30 of a tubular chamber 31. The inner diameter of the tubular chamber 31 is larger than the outer diameter of the inner tube 26, and the shoulder 29 on the stopper 23 holds the tube 26 and the tube 31 in concentric, spaced relationship with each other, as is shown in the drawings.

To the upper end of the tube 26, a pour-spout 32 may be secured, having a fluid-discharge bore 33 and an air-intake passageway 34 therein, both of which are in communication with the interior of the central tube or conduit 26. The pour-spout 32 may have an angular portion 35 whereby to discharge the fluid therefrom at an angle to the axis of the bottle to which the stopper and pour-spout are secured. A cap 36 may be pivotally secured to the spout 32, as by the prongs 37 (see Figure 6). The spout 32 is secured to the stopper 23 and to the tube 26 in a fluid-tight relationship. The inter-connection between the spout 32, the stopper 23, the conduit 26 and chamber 31 may be other than shown in the drawings. The primary object is to hold the conduit 26 and the chamber 31 in spaced relationship with each other and also using the stopper 23 both as a supporting means for the measuring-means and the pour-spout as well as a closure for the bottle. The pour-spout 32 may be omitted and the upper end of the tube 26 extended beyond the surface 28 of the stopper 23.

The outer tube or chamber 31 may be of any appropriate size, being limited only by the inner diameter 22 of the neck 21 of the bottle 20. The wall of the chamber 31 should be thick enough to withstand fluid-pressure and to prevent the deformation of the chamber 31 under constant handling and use. Thus, the diameters and relative sizes shown in the accompanying drawings are merely illustrative and it is to be understood that the dimensions may be varied to suit the appropriate design of any bottle into the orifice of which the measuring-type pour-spout of the present invention will be secured, as well as to permit variations in the quantity of liquid to be metered and dispensed each time the container is inverted.

The outer chamber 31 may be a single member or may be composed of a number of individual conduits or chambers (as, for instance, the two separate units 31-a and 31-b operatively secured together by the shoulder 31-c). The use of a plurality of chambers or conduits 31 permits variations in the design of the metering means of the present invention as well as variations in the capacity of the liquid to be dispensed therefrom. However, the chamber 31 may be one single unit of generally cylindrical or tube-like shape having a closed bottom 38 with an open upper end adapted to be secured to the shoulder-like reduced diametered portion 29 of the stopper 23.

Figure 5:
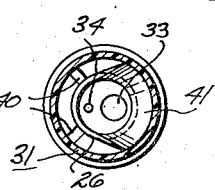
Figure 5 represents a horizontal cross-sectional view along line 5—5 of Figure 4.

To hold the lower end 39 of the inner conduit 26 in spaced relationship with the inner wall of the chamber 31, a plurality of spacer-members 40 may be formed radially inwardly from the outer chamber 31, as shown particularly in Figure 5. A portion 41 of the lower periphery 44 of the inner conduit 26 may be outwardly flared and adapted to contact the inner wall of the outer chamber 31 to act both as a scoop for the liquid whereby to direct the liquid into the inner conduit 26 as well as to hold the inner conduit 26 in spaced relationship with the outer chamber 31. Thus, the spacer members 40 and the flared lip 41 serve to support the lower end 39 of the inner conduit 26 within the outer chamber 31.

The outer chamber 31 has a liquid outlet port 42 formed near the upper end thereof, below the shoulder portion 29 of the stopper 23, and a second port 43, which may be called an air-inlet port, formed near the lower edge 44 of the inner conduit 26, for a purpose to be hereinafter explained.

In assembling the measuring-type pour-spout of the present invention, the upper peripheral edge 30 of the outer chamber 31 may be cemented or otherwise secured to the reduced diametered portion 29 of the stopper 23 with the upper edge 27 of the inner conduit 26 operatively secured and cemented to the inner bore 25 of the stopper 23 and with the lower end 39 of the inner conduit 26 securely held by the spacer members 40 and the flange 41 within the chamber 31. A neck-portion 45 of the pour-spout 32 may be secured within the upper end 27 of the conduit 26 and cemented or otherwise secured thereto in fluid-tight relationship. The above assembly comprises the measuring-type pour-spout of the present invention forming the cup-like recess 46 below the lower edge 44 of the inner conduit 26 within the chamber 31, and the annular space 47 between the inner conduit 26 and the outer chamber 31 above the lower edge 44 of the inner conduit 26 and beneath the stopper 23. The fluid-discharge passageway 33 and the air-intake passageway 34 both form continuations of the hollow conduit 26 in communication with the outside of the bottle 20.

The operation of the present invention is as follows. The measuring-type pour-spout of the present invention is operatively secured in the neck 21 or otherwise in the orifice of the bottle 20 as is shown particularly in Figure 2. In this position the chamber 31 depends entirely within the bottle 20 with only the liquid-guide or pour-spout 32 extending thereabove. If the liquid-level 48 is as shown in Figure 2, the liquid will not enter the interior of the chamber 31 either through the port 43 or through the port 42 (which are the only means of access to the inside of the chamber 31 from within the interior of the bottle 20). If the liquid level 48 is higher than the opening 43, the liquid will flow into the recess 46 through the port 43 until the liquid level outside the chamber 31 is at the same level as the liquid inside the chamber 31 or until the liquid level 48 in the bottle 20 falls below the port 43. The measuring-type pour-spout of the present invention may be appropriately dimensioned so that the port 43 will be above the liquid level 48 of each container into which the pour-spout of the present invention is inserted. Thus, the port 43 may be positioned so that no liquid will flow into the recess 46 either through the port 42 or through the port 43 until the bottle 20 is tipped from its upright position as shown in Figure 2.

In order to "charge" the pour-spout of the present invention and prepare it to deliver a measured quantity of fluid, it is necessary only to invert the bottle 20, as shown in Figure 3. With the bottle inverted, the liquid level 48 will be above the chamber 31 (or at least above the ports 42 and 43) so that the fluid within the bottle 20 may flow into the space 47 through the port 42, as is shown particularly in Figure 3.

The liquid will flow into the space 47 between the inner conduit 26 and the outer chamber 31 until the liquid level 49 within the chamber 31 rises almost to the edge 44 of the inner conduit 26, i. e., to cover the port 43. During the time that the liquid is flowing within the space 47, the air may be dispelled therefrom and be displaced through the chamber 46 and out through the inner bore of the passageway 26 and the air-intake passageway 34 or the fluid-discharge passageway 33. During this flow of liquid through the port 42, air to displace said liquid in the bottle is entering through the bore 33 or the passageway 34, tube 26 and port 43, and bubbling up through the liquid in the bottle to the air space above the liquid level 48. However, when the liquid-level in the space 47 rises to the height shown at 49 in Figure 3, the port 43 is closed and no more air can enter the bottle through said port. The air in the bottle above the liquid level 48 then forms an "air-lock" and stops the flow of liquid through the port 42. Of course, this "air-lock" is equally effective to keep liquid from flowing through the port 43. Thus, the liquid will not rise any higher than the position shown in Figure 3.

During the first inversion of the bottle, as above described, no fluid will be discharged therefrom inasmuch as the recess 46 has no fluid therewithin.

Figure 4:
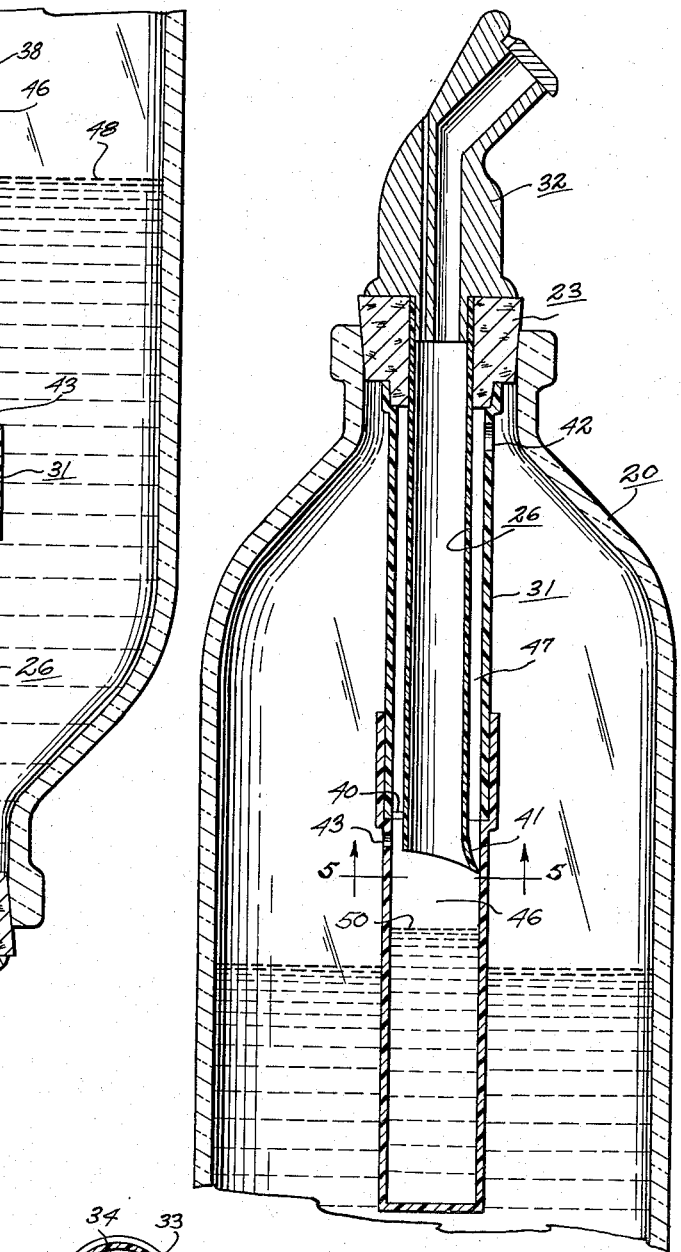
Figure 4 represents a cross-sectional view similar to Figures 2 and 3 but showing the bottle in its upright position with a metered quantity of fluid within the measuring portion of the present invention, prior to discharge therefrom.

When the bottle is placed right-side-up (after its first inversion) the liquid which filled the space 47 now flows downwardly within the chamber 31 and collects within the lower cup-shaped recess 46 thereof, as is shown in Figure 4. If the liquid within the space 47 is of greater volume than the capacity of the cup-shaped recess 46, the excess may flow outwardly within the bottle 20 through the port 43. If the quantity of liquid is not sufficient to fill the cup-shaped recess 46, then the liquid will assume a position like that shown in Figure 4, with the liquid level 50 as shown in Figure 4. The liquid within the cup-shaped recess 46 thus becomes the metered and measured quantity of fluid which will be discharged through the conduit 26 upon the next inversion of the bottle. When the bottle is next inverted to the position shown in Figure 3, the fluid within the cup-shaped recess 46 will be scooped up by the flared lip 41 of the conduit 26 and discharged therefrom through the fluid discharge passageway 33. At the same time that the fluid is being discharged from the cup-shaped recess 46, a new supply of liquid is being metered and measured within the space 47, as is shown in Figure 3. Thereafter, each inversion and re-positioning of the bottle in an upright position will dispense a metered quantity of fluid from the bottle as well as measure another equal quantity thereof and place it within the cup-like recess 46 of the chamber 31 in preparation for the next inversion of the bottle.

It is obvious that the capacity of the space 47, as shown particularly in Figure 3, may be varied by proper selection of the inner conduit 26 and the outer chamber 31 so that an appropriate and predetermined volume of fluid may be measured therein. Thus, we prefer that the quantity of fluid measured within the passageway 47 be equal to a "jigger" or the like, which is approximately one and one-half fluid ounces and which is customarily the amount of liquid dispensed from a liquor bottle by a taproom owner or a bartender for each single drink of liquor. However, the capacity of the space 47 may be varied so that any desired quantity of fluid may be dispensed or measured therewithin.

Similarly, the location of the port 43 and the length of the inner conduit 26 may be changed and thus permit more (or less) fluid to be measured or metered within the space 47.

Likewise, the port 43 may be appropriately placed along the outer surface of the chamber 31 so that the liquid retained within the cup-shaped recess 46 thereof (upon setting the bottle upright) will be equal to the desired quantity of fluid to be dispensed on the next inversion of the bottle.

It will be noted that the scoop portion 41 of the inner conduit 26 engages the inner wall of the outer chamber 31 at the same side of the axis thereof as that toward which the discharge bore 33 is curved in the stopper 32. This is advantageous because it influences the user to tilt or turn the bottle, when inverting it, to that side, i. e., through a clockwise turning direction as viewed in Figure 4, which will cause the scoop to act most efficiently in receiving liquid from the recess 46 and conducting it out through the inner conduit 26 rather than into the space 47, into which some of the liquid would pass if the bottle had been turned in the opposite direction.

Although we have shown only two ports 42 and 43 offering communication between the interior of the chamber 31 and the interior of the bottle 20, any appropriate number of ports or apertures may be placed therein at the approximate level or position shown with respect to the ports 42 and 43 so that the fluid will pass quickly from one chamber to another without causing any bubbling or turbulence therein and without causing the operator of the present invention to wait unduly long for the fluid to flow from one chamber to the other.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having described our invention what we claim as new and desire to protect by Letters Patent is the following:

1. In a liquid dispensing device for use with a liquid container, a tubular measuring-chamber having container closure means at one end and imperforate at the other end and depending wholly within said container, a bore in said closure means, a conduit operatively connected to said bore with the inner end of said conduit disposed within said measuring-chamber and a portion of the periphery of the inner end of said conduit in contact with the inner wall of said measuring-chamber, a liquid outlet port in the side-wall of said measuring chamber near said closure means and an air inlet port in the side-wall of said measuring-chamber in radial juxtaposition to the inner end of said conduit.

2. The combination claimed in claim 1, in which the conduit is in contact with a portion of the inner wall of the measuring chamber at one side only of the axis thereof and the closure means and the bore thereof are curved toward said side of the axis of the measuring chamber.

3. In a liquid dispensing device for use with a liquid-container, a tubular measuring-chamber having container closure means at one end and imperforate at the other end and depending wholly within said container, a bore in said closure means, a conduit operatively connected to said bore with the inner end of said conduit disposed within said measuring-chamber and a portion of the periphery of the inner end of said conduit in contact with the inner wall of said measuring chamber, and a port in the side wall of said measuring chamber in radial juxtaposition to the inner end of said conduit.

4. In a liquid dispensing device for insertion into a liquid container having an orifice, a container closure having an outlet bore, a conduit communicating with said bore and adapted to extend into the container when the closure is mounted in the container orifice, and a measuring tube longer than the conduit, having a closed inner end and surrounding the conduit, with a measuring space intervening between the walls of said tube and conduit, said measuring tube being provided with a pair of axially spaced ports including a port near said closure for admitting liquid into the measuring space when the device is inverted and including also a port near the inner end of the conduit and between said end and the closure for admitting air to the container in said inverted position to displace the liquid admitted into the measuring space.

5. A metering liquor-dispensing device for use in conjunction with an original bottle of liquor and adapted to be detachably affixed to the mouth of an original bottle of liquor in fluid-sealed relation thereto, said dispenser including a measuring-chamber in communication with the interior of the bottle adjacent the mouth, whereby liquor will flow from the interior of the bottle into said measuring-chamber when the bottle is inverted, a storage-reservoir extending into the bottle and in communication with said measuring-chamber through a liquor-passageway and so arranged in relation thereto that when the bottle is right side up the liquor which had theretofore flowed into the measuring-chamber in the inverted position of the bottle will then flow from the measuring-chamber into said storage-reservoir, and a liquor-discharge-conduit communicating with said storage-reservoir, with its wall at the inner end thereof disposed in laterally-spaced relationship to a portion of the inner wall of the storage reservoir and in contact with another portion of said wall, so that when the bottle is tipped from its right side up position to a gradually inclined pouring position toward the side of the dispensing device having said contacting wall portions, the liquor from said storage-reservoir will tend to flow substantially through said discharge conduit; said liquor-discharge-conduit passing through said measuring chamber and terminating in a pouring spout.

6. A metering liquor-dispensing device for use in conjunction with an original bottle of liquor and adapted to be detachably affixed to the mouth of an original bottle of liquor in fluid-sealed relation thereto, said dispenser including a measuring-chamber in communication with the interior of the bottle adjacent the mouth, whereby liquor will flow from the interior of the bottle into said measuring-chamber when the bottle is inverted, a storage-reservoir extending into the bottle and in communication with said measuring-chamber through a liquor-passageway and so arranged in relation thereto that when the bottle is right side up the liquor which had theretofore flowed into the measuring-chamber in the inverted position of the bottle will then flow from the measuring-chamber into said storage-reservoir, a liquor-discharge-conduit communicating with said storage-reservoir, with its wall at the inner end thereof disposed in laterally-spaced relationship to a portion of the inner wall of the storage reservoir and in contact with another portion of said wall, so that when the bottle is tipped from its right side up position to a gradually inclined pouring position toward the side of the dispensing device having said contacting wall portions, the liquor from said storage-reservoir will tend to flow substantially through said discharge conduit; said liquor-discharge-conduit passing through said measuring chamber and terminating in a pouring-spout, and an air-passageway having its outer inlet terminal exteriorally of the aforesaid mouth-zone and its inner terminal in communication with said measuring-chamber; the inner terminal of said air-passageway being spaced laterally in relation to said liquor-discharge-conduit in a direction opposite the direction in which the liquor-discharge-conduit is spaced laterally in relation to the inner end of said liquor-passageway.

7. A metering liquor-dispensing device for use in conjunction with an original bottle of liquor and adapted to be detachably affixed to the mouth of an original bottle of liquor in fluid-sealed relation thereto, said dispenser including a measuring-chamber in communication with the interior of the bottle adjacent the mouth, whereby liquor will flow from the interior of the bottle into said measuring-chamber when the bottle is inverted, a storage-reservoir extending into the bottle and in communication with said measuring-chamber through a liquor-passageway and so arranged in relation thereto that when the bottle is right side up the liquor which had theretofore flowed into the measuring-chamber in the inverted position of the bottle will then flow from the measuring-chamber into said storage-reservoir, and a liquor-discharge-conduit communicating with said storage-reservoir, with its wall at the inner end thereof disposed in laterally-spaced relationship to a portion of the inner wall of the storage reservoir and in contact with another portion of said wall, so that when the bottle is tipped from its right side up position to a gradually inclined pouring position toward the side of the dispensing device having said contacting wall portions, the liquor from said storage-reservoir will tend to flow substantially through said discharge conduit; said liquor-discharge-conduit passing through said measuring chamber and terminating in a directionally off-center pouring-spout which is off-center in the same direction as the off-center relation of the inner end of the aforesaid liquor-discharge-conduit to said liquor-passageway.

8. A metering liquor-dispensing device for use in conjunction with an original bottle of liquor and adapted to be detachably affixed to the mouth of an original bottle of liquor in fluid-sealed relation thereto, said dispenser including a measuring-chamber in communication with the interior of the bottle adjacent the mouth, whereby liquor will flow from the interior of the bottle into said measuring-chamber when the bottle is inverted, a storage-reservoir extending into the bottle and in communication with said measuring-chamber through a liquor-passageway and so arranged in relation thereto that when the bottle is right side up the liquor which had theretofore flowed into the measuring-chamber in the inverted position of the bottle will then flow from the measuring-chamber into said storage-reservoir, a liquor-discharge-conduit communicating with said storage-reservoir, with its wall at the inner end thereof disposed in laterally-spaced relationship to a portion of the inner wall of the storage reservoir and in contact with another portion of said wall, so that when the bottle is tipped from its right side up position to a gradually inclined pouring position toward the side of the dispensing device having said contacting wall portions, the liquor from said storage-reservoir will tend to flow substantially through said discharge conduit; said liquor-discharge-conduit passing through said measuring chamber and terminating in a directionally off-center pouring-spout which is off-center in the same direction as the off-center relation of the inner end of the aforesaid liquor-discharge-conduit to said liquor-passageway, and an air-passageway having its outer inlet terminal exteriorally of the aforesaid mouth-zone and its inner terminal in communication with said measuring-chamber; the inner terminal of said air-passageway being spaced laterally in relation to said liquor-discharge-conduit in a direction opposite the direction in which the liquor-discharge-conduit is spaced laterally in relation to the inner end of said liquor-passageway.

SIDNEY P. RADELOFF.
RAYMOND J. FALCONE.

References Cited in the file of this patent

UNITED STATES PATENTS

| Number | Name | Date |
| --- | --- | --- |
| 1,687,705 | Androff | Oct. 16, 1928 |
| 2,110,713 | Peters | Mar. 8, 1938 |

FOREIGN PATENTS

| Number | Country | Date |
| --- | --- | --- |
| 397,407 | France | Feb. 24, 1909 |